Sept. 11, 1956  J. B. LITTON  2,762,852
ADSORPTION PROCESS
Filed April 29 1953
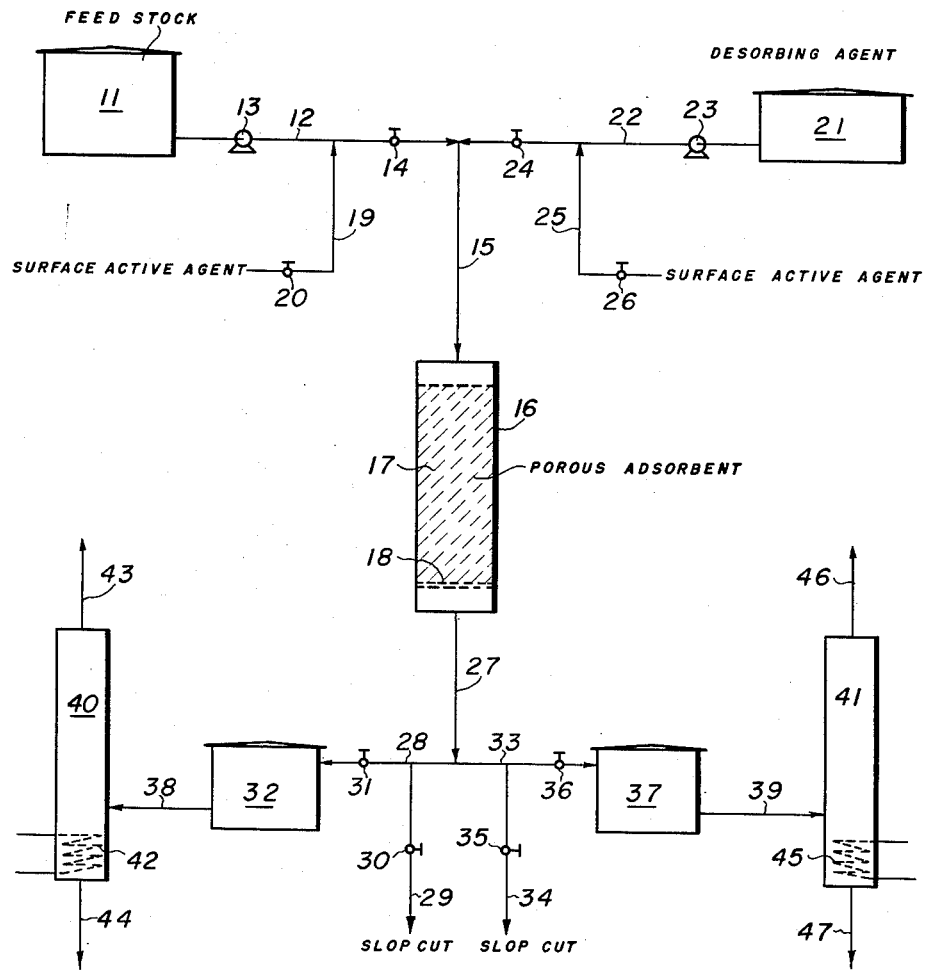
INVENTOR.
James B. Litton,
BY
ATTORNEY.

United States Patent Office 2,762,852
Patented Sept. 11, 1956

2,762,852
ADSORPTION PROCESS

James B. Litton, New York, N. Y., assignor, by mesne assignments, to Esso Research and Engineering Company, Elizabeth, N. J., a corporation of Delaware Application April 29, 1953, Serial No. 351,871

16 Claims. (Cl. 260—674)

The present invention is directed to an adsorption process in which a hydrocarbon is contacted with a porous adsorbent. More particularly, the invention is directed to an adsorption process in which a hydrocarbon is subjected to contact with a porous adsorbent, such as silica gel, to adsorb the hydrocarbon and then the adsorbed hydrocarbon is desorbed by employment of an organic desorbing agent. In its more specific aspects, the invention is directed to a method of improving a cyclic adsorption process in which a bed of porous adsorbent is contacted alternately with first and second hydrocarbons.

The present invention may be briefly described as involving an adsorption process in which a bed of a porous adsorbent, such as silica gel, is contacted with a hydrocarbon or a petroleum fraction to adsorb components thereof and the adsorbed components then desorbed from the porous adsorbent by contacting the porous adsorbent containing adsorbed components with an organic desorbing agent to which has been added a small but sufficient amount of a surface active agent.

The invention is particularly directed to a cyclic adsorption process in which a bed of a porous adsorbent, such as silica gel and the like, is alternately contacted with a first hydrocarbon, such as a petroleum fraction, and then with another hydrocarbon having a boiling range different from or outside of the boiling range of the first hydrocarbon. In this particular process my contribution is the addition of a surface active agent to either or both of the hydrocarbons charged alternately to the bed of porous adsorbent. By adding to either or both of the said hydrocarbons, a small but sufficient amount of a surface active agent, it is possible to improve to a marked degree the effect of the hydrocarbons in desorbing each other.

The porous adsorbent employed in the practice of the present invention will preferably be silica gel but may be other types of porous adsorbents, such as activated alumina or adsorbents having adsorptive characteristics similar to silica gel, such as activated carbon, such as exemplified by coconut charcoal, in that one hydrocarbon in a mixture of hydrocarbons of dissimilar types is adsorbed preferentially. The porous adsorbent is preferably silica gel having a mesh size from about 14 to about 250 mesh although silica gel having mesh sizes up to as high as 350 mesh may suitably be used. Silica gel is a well known article of commerce and further description thereof is not deemed necessary.

The activated carbon may be an activated char or carbon, such as is available in the industry and may be produced from a large variety of substances, such as bagasse, corn cobs, other farm products, cereals, blood, kelp, petroleum sludges, acid petroleum residue, coconuts, fruit pits, and many other sources too numerous to mention here. It is to be understood that the activated carbon to be employed in my invention must be suitably activated as understood in the industry. There are many methods for preparing activated carbon, and I intend to employ an activated carbon or charcoal within the meaning of the terminology known to the industry. When activated carbon or charcoal is employed in my process, it may have a mesh size in the range given for silica gel.

Activated alumina may also be used as a porous adsorbent in making such separation, and I contemplate that activated alumina may also be used. The terminology, "activated alumina," is well understood, and further description thereof is not deemed necessary. The activated alumina will also have mesh sizes comparable to that recited for the silica gel.

The hydrocarbon feed stock, such as a petroleum fraction, employed in the process of my invention, may suitably be a hydrocarbon in the gasoline, kerosene, gas oil or lubricating oil boiling range; for example, it may be a suitable hydrocarbon fraction boiling in the range from about 150° to about 450° F., or it may range from 450° to 750° F. Suitably the feed stock may be a lubricating oil fraction from which it is desired to remove aromatic constituents. The organic desorbing agent may suitably be a hydrocarbon or a petroleum fraction in the gasoline, kerosene, gas oil or lubricating oil boiling range having a boiling point or boiling range different from that of the hydrocarbon feed. In short, the organic desorbing agent may be a second hydrocarbon feed. The boiling point or boiling range of the organic desorbing agent may be higher or lower than the boiling point or boiling range of the hydrocarbon feed. I contemplate that the organic desorbing agent will have a boiling point different from that of the hydrocarbon feed.

It is contemplated that the organic desorbing agent may be non-hydrocarbon. For example, I may suitably employ an alcohol, such as an aliphatic alcohol, as the organic desorbing agent. Examples of the aliphatic alcohols which suitably may be employed include methyl, ethyl, and propyl alcohols, butyl alcohols and the amyl alcohols. Desirable results may be obtained with ethyl alcohol.

The first and second hydrocarbons may contain aromatic, naphthenic, olefinic and paraffinic hydrocarbons which may be separated by hydrocarbon types in accordance with my invention. Thus by employing one porous adsorbent, it may be possible to separate one type of hydrocarbon from another type of hydrocarbon. Also in the practice of my invention, it is possible to desorb one adsorbed hydrocarbon with another hydrocarbon of the same type as the adsorbed hydrocarbon. Thus one aromatic hydrocarbon of a different boiling point may serve to desorb an adsorbed hydrocarbon. The same holds true for the other types of hydrocarbons. The organic desorbing agent may be a different type of hydrocarbon; such as an aromatic hydrocarbon, and may be desorbed by a paraffinic hydrocarbon or by a non-hydrocarbon organic desorbing agent of the type illustrated.

The desorbing agent, whether it is a second hydrocarbon feed or a non-hydrocarbon, should contain a minor but effective amount of a suitable surface active agent. The amount of said surface active agent may range from about 0.1 to about 10% by volume, preferably 0.5 to 5% by volume, based on the desorbing agent, although lower or higher concentrations may be effective depending on the wetting and solubilizing characteristics of the material. It is important that the surface active agent be soluble in the organic desorbing agent.

As examples of the desirable surface active agents for use in this invention may be mentioned the partial esters of polyhydroxy organic compounds such as the ester and ester-ether complexes of alcohols, alkylene oxides and monocarboxylic acids. The partial ester and partial ester-ether complexes of polyhydroxy aliphatic alcohols and $C_{10}$–$C_{22}$ monocarboxylic acids such as the partial esters of polyalkylene glycols and the common fatty acids, are quite useful. Alkane sulfonic acids, alkyl aromatic sulfonic acids and salts thereof and a variety of other surface active agents such as those described by Schwartz et al., Interscience Publishers, Inc., 1949, that are soluble in hydrocarbons or the organic desorbing agent, may suitably be employed. As examples of the several specific surface active agents may be mentioned polyethylene glycol monolaurate, pentaerythritol monooleate, sorbitan monooleate, monolauryl epoxy sorbitolate, the monooleate of monodehydrated sorbitol, cetyl benzene sulfonic acid, and the like.

The time which the feed hydrocarbon and the organic desorbing agent or second feed hydrocarbon will be in contact with the porous adsorbent may range from about 15 minutes to as much as 2 hours or more. The time for flowing the feed hydrocarbon to the bed of porous adsorbent may be substantially the same as the time for flowing the organic desorbing agent or second hydrocarbon through the bed depending, of course, on the relative concentration in the two fractions of the hydrocarbon which it is desired to adsorb on the porous adsorbent.

The bed of porous adsorbent may be provided with suitable length to diameter ratios to give best results. The beds may be elongated beds having a length to diameter ratio in the range from about 1:1 to 200:1. Good results have been obtained with beds having a length to diameter ratio of about 48:1. The amount of the porous adsorbent employed should be in excess of the amount of hydrocarbon flowed to the bed. For example, in a single pass operation, the adsorbent to oil ratio may be in the range from about 2:1 to 30:1. Desirable results may be obtained with a silica gel to oil ratio of about 10:1.

The invention will be further illustrated by reference to the drawing in which the single figure is a flow diagram of a preferred mode.

Referring now to the drawing, numeral 11 designates a charge tank in which is arranged an aromatic petroleum fraction such as one obtained by hydroforming a selected naphthenic fraction boiling in the range from about 200° to about 450° F. The fraction in tank 11, for the purposes of this description, may be assumed to contain xylenes and non-aromatics, such as those having nine carbon atoms in the molecule. The feed stock in tank 11 by virtue of the previous hydroforming operations may contain a small amount of olefins. The feed stock in tank 11 is withdrawn therefrom by line 12 containing pump 13 and controlled by valve 14. This feed stock is routed by line 15 into an adsorption zone 16 which suitably may be a plurality of adsorption zones each containing a bed 17 of porous adsorbent, such as silica gel, activated carbon or alumina. The bed of silica gel may be suitably arranged on a grid plate 18 to retain same in the zone 16. The feed stock flowing through line 12 may have suitably added to it a small quantity of a surface active agent which may be introduced into line 12 by line 19 controlled by valve 20. The feed stock is allowed to flow into adsorption zone 16 downwardly therethrough for selective adsorption of the xylenes on a porous adsorbent. Flow is continued to the bed 17 for a time sufficient to fill completely the bed with adsorbed and unadsorbed material. After the bed has been filled completely with the adsorbed xylenes and unadsorbed saturated hydrocarbons, flow from tank 11 is interrupted by shutting down pump 13 and closing off valve 14 and, if surface active agent was being introduced, closing valve 20. Flow is then directed to adsorption zone 16 from tank 21 which contans an organic desorbing agent of the type illustrated which may be a second hydrocarbon, such as an aromatic hydrocarbon, and may be a hexane fraction containing benzene, naphthenes and paraffins. In any event, the organic desorbing agent is withdrawn by line 22 containing pump 23 and controlled by valve 24. Preferably there is introduced into the organic desorbing agent in line 22 a small but sufficient amount, say 1% by volume, of a surface active agent by line 25 controlled by valve 26. The organic desorbing agent is flowed by way of line 15 into adsorption zone 16 downwardly therein resulting in the selective or preferential adsorption of the benzene and desorption of the xylenes which were adsorbed on the silica gel. As a result, there is displaced from the bed 17 a mixture of benzene and some xylene and non-aromatic hydrocarbons. This is flowed from zone 16 by line 27 into line 28 and outwardly therefrom by line 29 controlled by valve 30. This is a slop cut, which may be further treated or reprocessed as desired. Once the slop cut is withdrawn by line 29, valve 30 therein is closed and valve 31 in line 28 is opened allowing the displaced xylenes from the bed 17 and the saturates from the desorbing agent in tank 21 to be discharged into tank 32 wherein they are accumulated.

Once the bed 17 has adsorbed its capacity for benzene, flow from tank 21 is interrupted by closing valve 24 and shutting down pump 23; valve 26 in line 25 would also be shut. Thereafter flow from tank 11 is resumed by starting pump 13 and opening valve 14 and valve 20 in line 19 as desired. This results in the effluent from line 16 flowing by line 27 into line 33 and, accordingly, therefrom by line 34 controlled by valve 35. This is a second slop cut of benzene, some xylenes and paraffins, since the xylenes in the feed in tank 11 were preferably adsorbed on the bed 17, and the benzene contained in the bed was desorbed. After the second slop cut is withdrawn by line 34, valve 35 therein is closed and valve 36 in line 33 is opened allowing the fraction withdrawn from zone 16 consisting essentially of benzene, $C_9$ non-aromatics and xylenes to be accumulated in tank 37.

Thereafter the products in tanks 32 and 37 may suitably be distilled by routing them, respectively, by lines 38 and 39 to distillation zones 40 and 41. In distillation zone 40, conditions of temperature and pressure are adjusted by heating means illustrated by a steam coil 42 to recover as an overhead fraction by line 43 the light saturates and by line 44 the xylenes.

Likewise in distillation zone 41 conditions of temperature and pressure are adjusted by a heating means illustrated by a coil 45 to allow recovery of benzene by line 46 which is separated from the xylenes and heavier saturates; the latter are withdrawn from zone 41 by line 47.

The presence of the surface active agent in either the feed stock in tank 11 or the second feed stock in tank 21 or both allows improved separation to be obtained in desorbing the adsorbed components from either of the hydrocarbon streams.

In order to illustrate the invention further, a column of silica gel was provided having a length to diameter ratio of 6:1 for use with a feed stock consisting essentially of equal parts of normal heptane, heptene-2 and toluene. The ratio of silica gel to the charge was approximately 10:1. Ethyl alcohol was used as the organic desorbing agent. Comparative runs were made with the hydrocarbon mixture containing no surface active agent and with the same hydrocarbon mixture containing 1% of polyethylene glycol mono-laurate derived from polyethylene glycol having an average molecular weight of about 400. Alcohol was charged to the column of silica gel after the mixture had been charged thereto. Improved separations were obtained where the surface active agent was present in the desorbing agent.

Another run was made in a column of silica gel having a ratio of length to diameter of 48:1 with a silica gel-oil ratio of about 10:1. In this operation the same feed mixture was employed with ethyl alcohol as the organic desorbing agent. After the hydrocarbon mixture had been charged to and adsorbed on the bed of silica gel, the ethyl alcohol was charged thereto to desorb the adsorbed components. In one case the ethyl alcohol did not contain a surface active agent, and in a second case the ethyl alcohol contained 1% by volume of polyethylene glycol monolaurate.

In the case where the surface active agent was present, the heptene-2 was obtained in a 24% yield of 97% purity. Heptane was recovered in 30% yield and had substantially complete purity.

These desirable results may be compared with the run where the surface active agent was absent. In that case, the heptene-2 was recovered in 18% yield of about 97% purity, whereas only 28% of the pure paraffins were recovered. This shows approximately 33% advantage in yields of 97% pure olefins for employing the organic desorbing agent containing the surface active agent over that where the surface active agent was absent.

The nature and objects of the present invention having been completely described and illustrated, what I wish to claim as new and useful and to secure by Letters Patent is:

1. In a method for separating a hydrocarbon feed charge mixture in the gasoline to lubricating oil boiling range comprising at least two hydrocarbon components of different absorptive characteristics which comprises contacting said mixture with a porous adsorbent under adsorption conditions to adsorb perferentially one of said components on said porous adsorbent and then desorbing said adsorbed component from said porous adsorbent by contacting said porous adsorbent containing said adsorbed component under desorption conditions with an organic desorbing agent charge, selected from the group consisting of aliphatic alcohols having from 1 to 5 carbon atoms and petroleum fractions in the gasoline to lubricating oil boiling range having a boiling point different from that of the feed hydrocarbon, the improvement which comprises including a small but effective amount of a surface active agent selected from the group consisting of the partial esters and ester-ether complexes of polyhydroxy alcohols, alkylene oxides, and $C_{10}$–$C_{22}$ monocarboxylic acids, the alkane sulfonic acids, alkyl aromatic sulfonic acids, and salts of the alkane and alkyl aromatic sulfonic acids soluble in at least one of said charges contacting said adsorbent.

2. A method in accordance with claim 1 in which the feed charge mixture is a mixture of aromatic and non-aromatic hydrocarbons.

3. A method in accordance with claim 2 in which the organic desorbing agent charge is a mixture of aromatic and non-aromatic hydrocarbons having a boiling range outside the boiling range of the feed stream mixture.

4. A method in accordance with claim 2 in which the organic desorbing agent charge is an aliphatic alcohol having from 1 to 5 carbon atoms.

5. A method in accordance with claim 1 in which the surface active agent is a partial ester of a polyhydroxy alcohol.

6. In a method in which a petroleum fraction in the gasoline to lubricating oil boiling range is contacted with a porous adsorbent under conditions to adsorb selectively at least a portion of said fraction and the adsorbed portion is desorbed by then contacting said porous adsorbent with an organic desorbing agent selected from the group consisting of aliphatic alcohols having from 1 to 5 carbon atoms and petroleum fractions in the gasoline to lubricating oil boiling range having a boiling point different from that of the feed petroleum fraction, the step of adding to said desorbing agent in contact with said porous adsorbent a small but effective amount of a surface active agent selected from the group consisting of the partial esters and ester-ether complexes of polyhydroxy alcohols, alkylene oxides, and $C_{10}$–$C_{22}$ monocarboxylic acids, the alkane sulfonic acids, alkyl aromatic sulfonic acids, and salts of the alkane and alkyl aromatic sulfonic acids soluble in said desorbing agent.

7. A method in accordance with claim 6 in which the amount of the surface active agent is in the range between about 0.1 and 10% by volume of said desorbing agent.

8. A method in accordance with claim 6 in which the porous adsorbent is silica gel.

9. A method in accordance with claim 6 in which the organic desorbing agent is a hydrocarbon having a boiling point different from the boiling range of the petroleum fraction.

10. A method in accordance with claim 6 in which the organic desorbing agent is an aliphatic alcohol.

11. A method in accordance with claim 6 in which the surface active agent is a mono ester of a polyhydroxy aliphatic alcohol and a $C_{10}$–$C_{22}$ fatty acid.

12. A method in which a bed of silica gel is alternately contacted with a feed petroleum fraction in the gasoline to lubricating oil boiling range to be separated into at least two components parts and then with an organic desorbing agent selected from the group consisting of the aliphatic alcohols having from 1 to 5 carbon atoms and petroleum fractions in the gasoline to lubricating oil boiling range having a boiling point different from that of the feed petroleum fraction, the step of adding to said organic desorbing agent in contact with said porous adsorbent an amount in the range from about 0.5 to 5% by volume, based on organic desorbing agent, of a mono fatty acid ester of a polyalkylene glycol.

13. A method in accordance with claim 12 in which the organic desorbing agent is a hydrocarbon fraction containing up to 5 carbon atoms.

14. A method in accordance with claim 12 in which the organic desorbing agent is a saturated hydrocarbon.

15. A method in accordance with claim 12 in which the organic desorbing agent is a hydrocarbon fraction containing aromatic hydrocarbons.

16. A method for separating a feed mixture of aromatic and non-aromatic hydrocarbons which comprises contacting a bed of silica gel with said feed mixture whereby said aromatic hydrocarbons are adsorbed thereon and then contacting said bed with ethyl alcohol containing in the range of about 0.5 to 5% by volume of polyethylene glycol mono-laurate whereby said adsorbed aromatics are desorbed.

References Cited in the file of this patent

UNITED STATES PATENTS

| | | |
|---|---|---|
| 2,448,489 | Hirschler | Aug. 31, 1948 |
| 2,499,236 | Van Gilder et al. | Feb. 28, 1950 |
| 2,635,074 | Steitz | Apr. 14, 1953 |